United States Patent
Capaldi-Tallon

(10) Patent No.: US 9,990,787 B2
(45) Date of Patent: Jun. 5, 2018

(54) SECURE DOOR ENTRY SYSTEM AND METHOD

(71) Applicant: ILLINOIS TOOL WORKS INC., Glenview, IL (US)

(72) Inventor: Alan Capaldi-Tallon, Portsmouth Hampshire (GB)

(73) Assignee: ILLINOIS TOOL WORKS INC., Glenview, IL (US)

( * ) Notice: Subject to any disclaimer, the term of this patent is extended or adjusted under 35 U.S.C. 154(b) by 85 days.

(21) Appl. No.: 14/426,181

(22) PCT Filed: Sep. 12, 2013

(86) PCT No.: PCT/US2013/059423
§ 371 (c)(1),
(2) Date: Mar. 5, 2015

(87) PCT Pub. No.: WO2014/043326
PCT Pub. Date: Mar. 20, 2014

(65) Prior Publication Data
US 2015/0228133 A1   Aug. 13, 2015

(30) Foreign Application Priority Data
Sep. 12, 2012 (GB) .................. 1216284.8

(51) Int. Cl.
*G07C 9/00* (2006.01)
*G06K 19/06* (2006.01)
(Continued)

(52) U.S. Cl.
CPC .... *G07C 9/00111* (2013.01); *G06K 19/06037* (2013.01); *G07C 9/00039* (2013.01);
(Continued)

(58) Field of Classification Search
CPC . G07C 9/00; G06K 19/06; G06K 9/00; G06K 9/68; G06Q 30/00; B65D 51/24
(Continued)

(56) References Cited

U.S. PATENT DOCUMENTS 7,012,503 B2 * 3/2006 Nielsen ............. G07C 9/00103
340/5.6
8,245,938 B2 * 8/2012 Lee ................... G06F 17/30879
235/462.11
(Continued)

FOREIGN PATENT DOCUMENTS

WO       2009128854 A1    10/2009

OTHER PUBLICATIONS

ISR and WO for PCT/US2013/059423 dated Jan. 8, 2014.

*Primary Examiner* — Nam V Nguyen
(74) *Attorney, Agent, or Firm* — Hauptman Ham, LLP

(57) ABSTRACT

A method for controlling access to a secure area via an electronic door entry system includes the steps of: displaying a bar code associated with the door entry system which can be read by a smartphone, the bar code encoding instructions for establishing a communications channel between the smartphone and a remote authentication system where a passcode for the door entry system can be obtained by an authorized person; receiving authentication data for a person over the communications channel from the smartphone; authenticating a person based on the authentication data; communicating a passcode to the smartphone; receiving a passcode input at the door entry system; verifying the passcode; and, generating a door lock release signal for the door entry system if the passcode is verified.

21 Claims, 3 Drawing Sheets

(51) Int. Cl.
*G06Q 30/00* (2012.01)
*B65D 51/24* (2006.01)

(52) U.S. Cl.
CPC ..... *G07C 9/00103* (2013.01); *G07C 9/00023* (2013.01); *G07C 9/00571* (2013.01)

(58) Field of Classification Search
USPC ............ 340/5.54, 5.61, 5.74, 5.81, 5.83; 382/124, 218; 235/380, 382, 384; 705/26.25, 27.1, 14.14
See application file for complete search history.

(56) References Cited

U.S. PATENT DOCUMENTS

| | | | | |
|---|---|---|---|---|
| 8,708,221 B1* | 4/2014 | Sprague | ............... | G06Q 10/08 235/375 |
| 8,844,811 B1* | 9/2014 | Rogers | ............... | G07C 9/00182 235/382 |
| 8,985,443 B1* | 3/2015 | Boyle | ............... | G07C 9/00722 235/375 |
| 9,111,402 B1* | 8/2015 | Krishnan | ............ | G07C 9/00158 |
| 9,202,322 B2* | 12/2015 | Kappeler | ............ | G07C 9/00031 |
| 2002/0178385 A1* | 11/2002 | Dent | ................. | G07C 9/00309 726/27 |
| 2003/0066883 A1* | 4/2003 | Yu | ....................... | G06K 7/1095 235/382 |
| 2005/0110610 A1* | 5/2005 | Bazakos | ............ | G06K 9/00228 340/5.82 |
| 2009/0324025 A1 | 12/2009 | Camp, Jr. et al. | | |
| 2011/0153398 A1* | 6/2011 | Tjhai | .................... | G06Q 30/02 705/14.14 |
| 2012/0091202 A1* | 4/2012 | Cohen | .................... | G06F 21/33 235/382 |
| 2012/0280783 A1* | 11/2012 | Gerhardt | ............ | G07C 9/00309 340/5.6 |
| 2013/0032634 A1* | 2/2013 | McKirdy | ............... | G06F 17/00 235/375 |
| 2013/0217410 A1* | 8/2013 | Ku | ....................... | H04W 4/008 455/456.1 |
| 2013/0257590 A1* | 10/2013 | Kuenzi | .................... | G05B 1/01 340/5.65 |
| 2015/0004996 A1* | 1/2015 | Finlow-Bates | ......... | H04W 4/02 455/456.1 |

\* cited by examiner

SECURE DOOR ENTRY SYSTEM AND METHOD

RELATED APPLICATIONS

The present application is a National Phase of International Application Number PCT/US2013/059423 filed Sep. 12, 2013 and which claims priority to Great Britain Application Number 1216284.8 filed Sep. 12, 2012.

BACKGROUND TO THE INVENTION

The security of buildings has never been as vital as it is today. Numerous door entry systems exist which serve to control access to prevent unauthorised persons gaining entry to a secure area.

One such system uses a numeric keypad coupled to a door lock which accepts the manual input of a passcode. If the passcode is verified a door lock release signal is generated which unlocks the door. This simple design does not require a human operator to supervise the door. However, the passcode accepted by the keypad is a static code which is susceptible to becoming known to unauthorised persons. Each time the passcode is changed the new code must be communicated to all authorised persons if they are each to continue to enjoy access.

More sophisticated door entry system employ biometrics to authenticate an authorised person but these systems typically require the door entry system to be coupled over a secure communications network to a database that stores the associated biometric data. The addition of new persons or temporary site visitors is time consuming as the biometric data must be captured and stored in advance.

SUMMARY OF THE INVENTION

According to one aspect of the present invention, a secure door entry system comprises: an input device for receiving a passcode; an electronic device coupled to the input device for verifying a received passcode and generating a door lock release signal if the passcode is verified; and, a machine readable bar code associated with the door entry system which encodes instructions for establishing a communications channel between a mobile communications device and a remote authentication system where a passcode for the door entry system can be obtained by an authorised person.

According to another aspect of the present invention, a method for controlling access to a secure area via an electronic door entry system comprises: displaying a bar code associated with the door entry system which can be read by a mobile communications device, the bar code encoding instructions for establishing a communications channel between a mobile communications device and a remote authentication system where a passcode for the door entry system can be obtained by an authorised person; receiving authentication data for a person over the communications channel from a mobile communications device; authenticating a person based on the authentication data; communicating a passcode to the mobile communications device; receiving a passcode input at the door entry system; verifying the passcode; and, generating a door lock release signal for the door entry system if the passcode is verified.

Preferably, the input device comprises at least one of a keypad, a touch sensitive screen, an image sensor and a wireless receiver.

The bar code is preferably displayed on or adjacent the input device. The bar code may be printed on a self-adhesive label or it may be digitally displayed on a display screen. In preferred embodiments, the bar code is a matrix bar code, more preferably a Quick Response (QR) code. A QR code is detected as a 2-dimensional digital image by an image sensor and then digitally analysed by a suitably programmed processor. Amongst others, QR codes can readily be scanned and recognised by Android and iOS mobile communication devices.

The communications channel encoded by the bar code may be a connection to a predetermined telephone number where the user can speak to a human operator or a voice-responsive computer operator to complete the authentication procedure.

Alternatively, the communications channel encoded by the bar code may be an internet connection to a predetermined Unique Resource Link (URL) where an online authentication procedure can be performed.

In preferred embodiments, the remote authentication system requires a verified login to authenticate a person, or the combination of the person and their mobile communications device.

The passcode may be a numeric or alphanumeric code, or a gesture. When employing a touch sensitive screen the passcode may be input as a swipe gesture. Where an image sensor is employed as an input device, the passcode may be encoded within a matrix bar code, preferably a Quick Response (QR) code, which can be displayed on the mobile communications device and scanned by the door entry system. Alternatively, the mobile communications device may transmit the passcode over a wireless communications channel, for example Bluetooth or Wifi to the input device.

DETAILED DESCRIPTION

Figure 1:
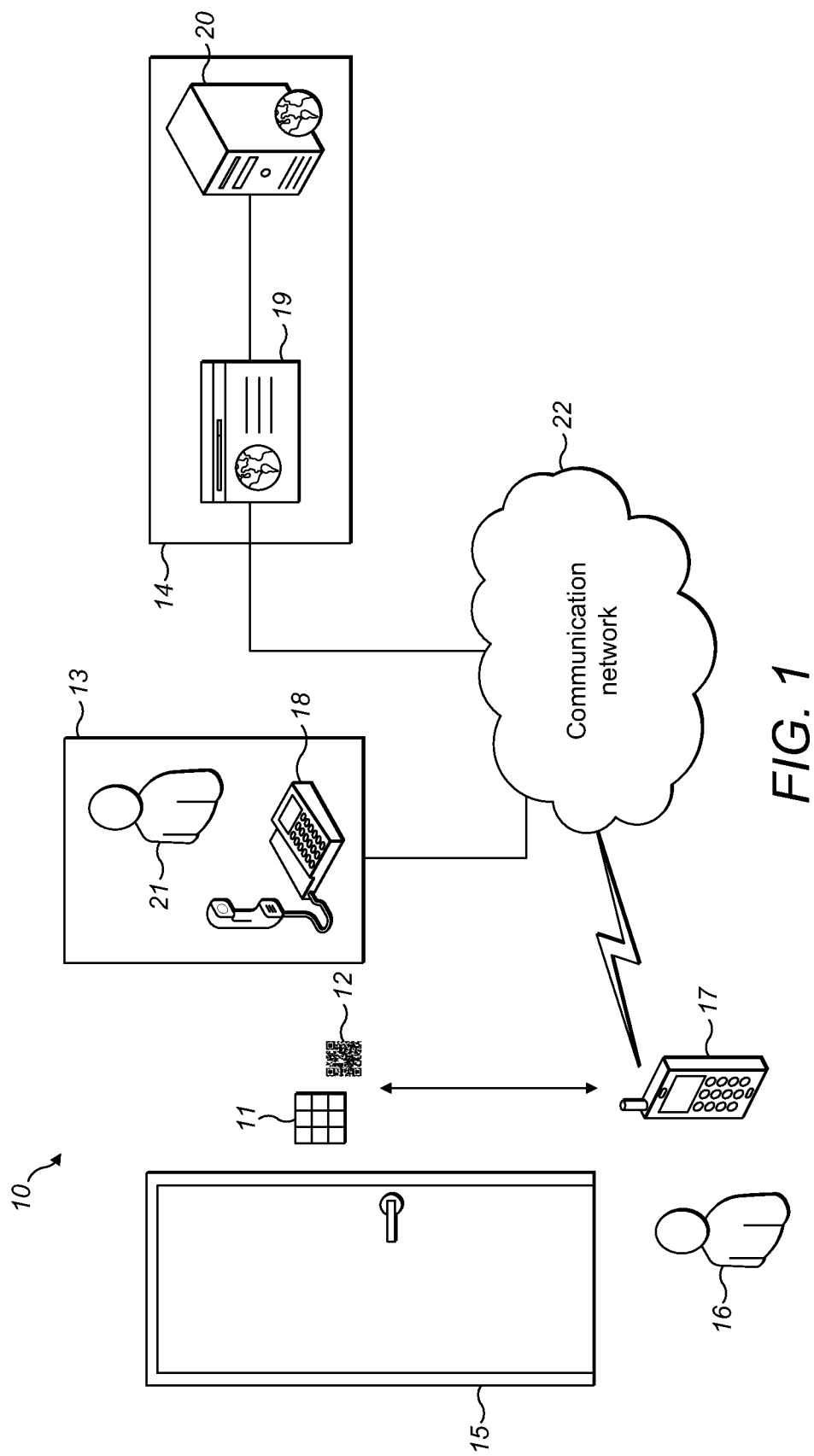
FIG. 1 is a simplified diagram of a secure door entry system that employs a keypad having an associated QR code which encodes instructions to connect to a remote authentication system.

FIG. 1 shows a simplified diagram of a secure door entry system 10 that employs a keypad 11 having an associated QR code graphic 12 which encodes instructions to connect to a remote authentication system 13, 14.

As shown, a door 15 incorporating an electronic lock (not shown) is coupled to a keypad panel 11. As is known, when the correct passcode is keyed by a user 16 in to the keypad 11 a door lock release signal is generated that operates an electronic relay (not shown) to unlock the door 15. The secure door entry system 10 of the present invention provides an improved method for obtaining a valid passcode. This allows the passcode to be changed regularly without having to communicate the new passcode to users. It also allows site visitors to be provided with access. The basic system does not require extensive communications infrastructure within a building to control access to secure areas.

Figure 2:
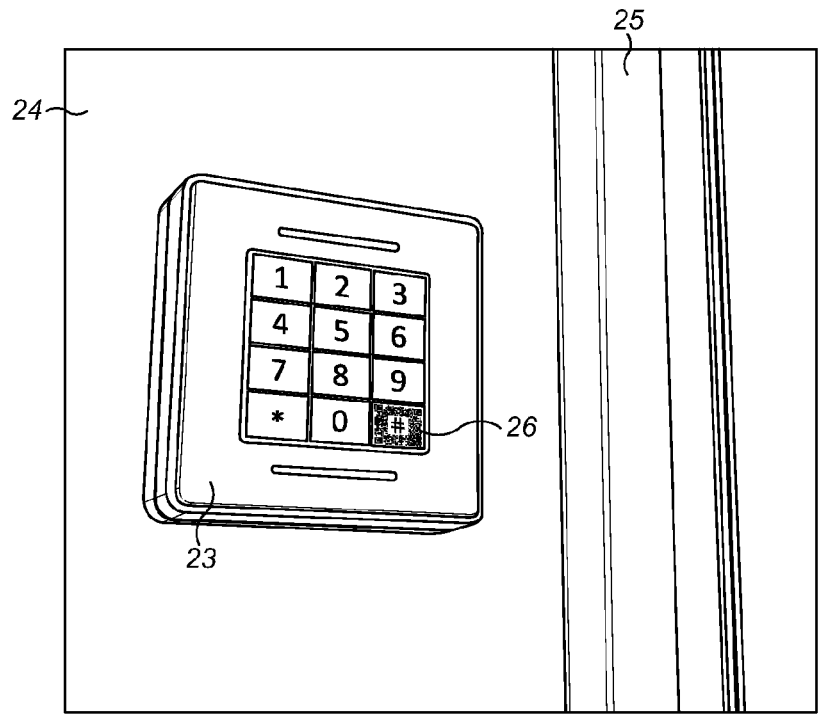
FIGS. 2 and 3 are examples of keypads which display an associated QR code which encodes instructions to connect to a remote authentication system; and, FIG. 4 is a flow diagram showing the process for obtaining a passcode for a secure door entry system.
Figure 3:
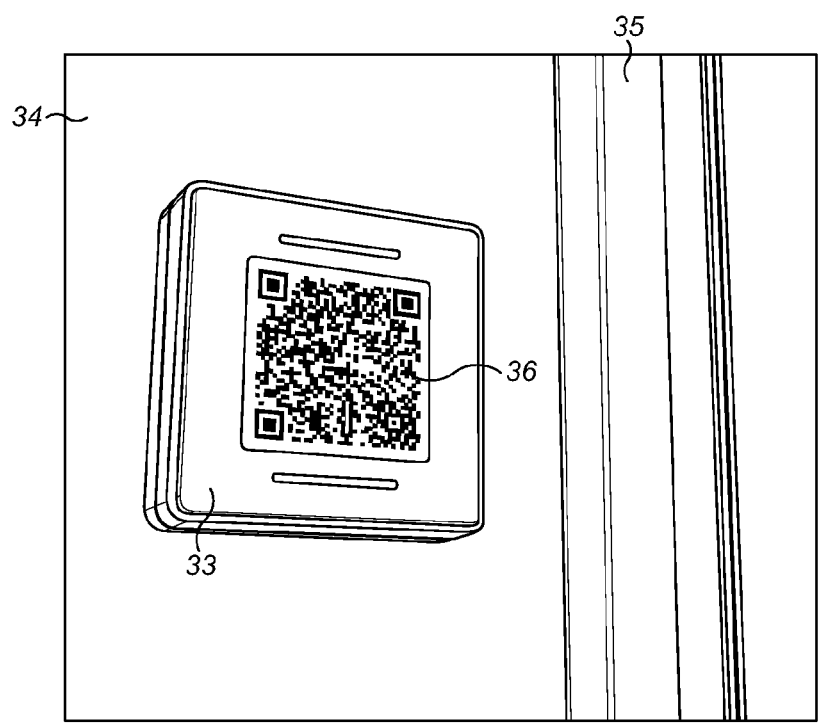

The keypad 11 is associated with a QR code graphic 12 displayed near, and preferably on, the keypad (see FIGS. 2 and 3). The QR code 12 can be read by a user's mobile telephone 17, commonly known as a smartphone, using an integrated digital camera and conventional barcode scanning software (not shown). As will be described below, the QR code 12 encodes instructions for establishing a communications channel between the smartphone 17 and an authentication service provider 13, 14 across a communications network 22. The instructions may include a telephone number for a call centre 18 or a URL for the landing page 19 of a web site 20.

In one example, the authentication service provider 13 may host a call centre 18 for receiving telephone calls made by a smartphone 17 after scanning the QR code 12. A human operator 21 is trained to ask security questions that are designed to authenticate the user 16 against stored security information for that user. Once authenticated, the user 16 is then either told the passcode for the door 15 or the passcode for the door is sent to the smartphone 17 by SMS text or email.

In another example, the authentication service provider 14 hosts a secure web site 20. The QR code encodes a landing page 19 for the web site 20 where the user 16 can enter personal login details for the authentication purposes via their smartphone 17. This may be a simple username and password login. Optionally, the authentication system also captures a unique identification for the smartphone 17, such as the handset IMEI or MAC address, in order to authenticate the user 16. Once authenticated, the passcode for the door 15 is displayed to the user on the smartphone 17 screen or the passcode for the door 15 is sent to the smartphone 17 by SMS text or email The passcode is typically a numeric code or an alphanumeric code for manual input on a traditional manual keypad or virtual keypad displayed on a touch-sensitive screen. However, in another example the passcode may be a touch gesture designed to be recognised as a touch input on a touch-sensitive screen.

FIG. 2 shows an example of a keypad 23 fixed to a wall surface 24 beside a door 25. The keypad 23 incorporates a QR code graphic 26 on one of the keys (in this case the # key). FIG. 3 shows another example of a keypad 33 fixed to a wall 34 beside a door 3. The keypad 33 is touch-sensitive screen that displays a QR code graphic 36. In this example, the passcode is input as one or more touch gestures. In both examples, the QR code can be read and recognised by a conventional camera in a smartphone running appropriate barcode scanning software.

A keypad panel may incorporate all the electronic circuitry to store a passcode for verification with a passcode input by a user, together with the electronic circuitry for generating a door release signal. However one or more of these functions can be carried out elsewhere as part of a host system so that the keypad panel merely functions as a simple terminal.

In one implementation, the passcode for a specific keypad and door is determined in advance and coded in to the keypad. A master passcode can be used to gain access to a system setup menu that allows the passcode to be set by an authorised person. This passcode can be changed periodically in order to provide enhanced security.

In an alternative implementation, the keypad can be connected over a to a host system which is able to generate and set the passcode from a remote location. The host system communicates the new passcode to the authentication service provider. The passcode can either be changed periodically, on demand, or it can be done on-the-fly each time a user requests authentication via their smartphone. The passcode can be changed after a predetermined count of the number of door accesses.

In a further possible implementation, the authentication service provider itself can generate the passcode and program the keypad from a remote location.

Figure 4:
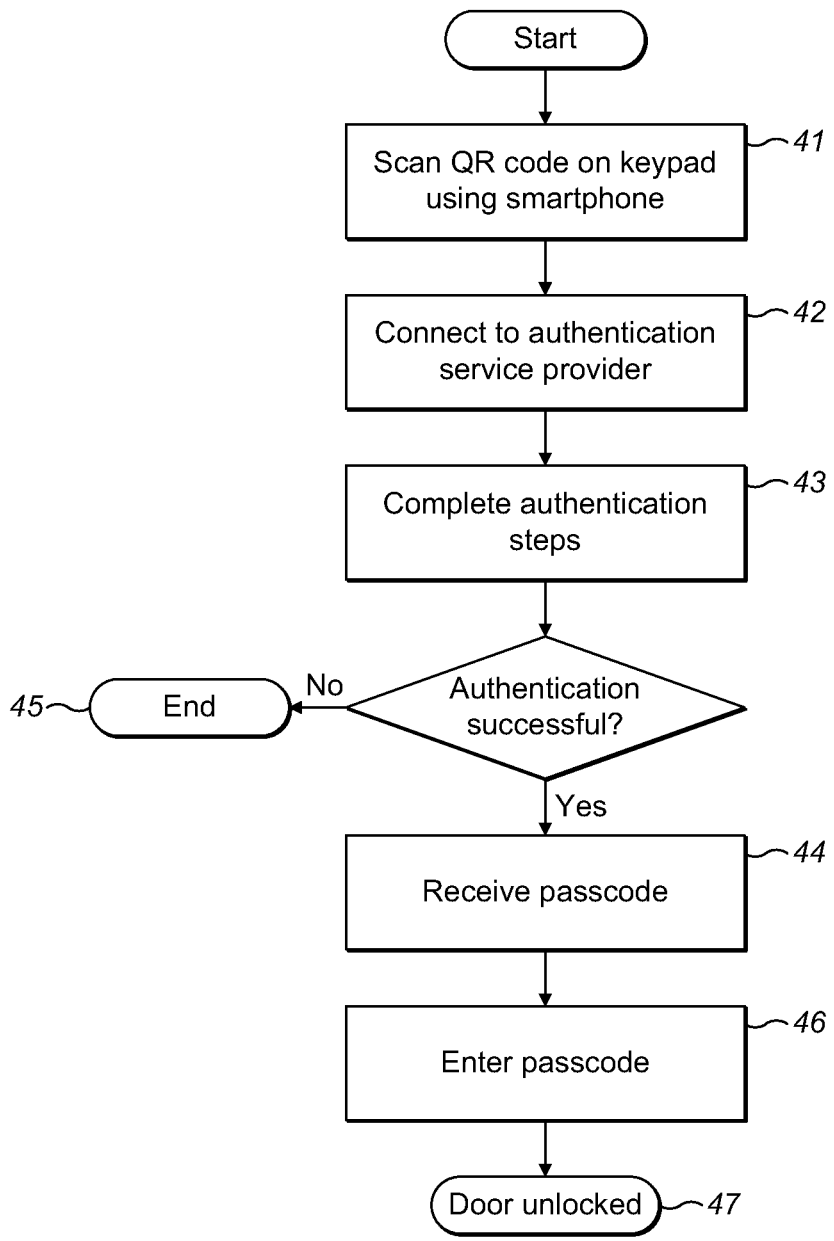

FIG. 4 is a simplified flow diagram showing the process for obtaining a valid passcode for unlocking a secure door. If a user does not know the passcode then they scan (step 41) the QR code at a door entry keypad using a smartphone. When the instructions encoded within the QR code are recognised by the smartphone, a communications channel is automatically established (step 42) between the smartphone and a remote authentication service. This may be an internet connection to a web site or it may trigger a telephone call to be made to a predetermined number of a call centre. The user follows the instructions to complete an authentication process (step 43) whereby the authentication service provider verifies the identity of the user, and optionally the smartphone. If the user is successfully authenticated then they are given a valid passcode for unlocking the door (step 44). If the user is not authenticated then they are not given the passcode (step 45). The passcode can then be entered (step 46) on the keypad and, if verified, the keypad will trigger the generation of a door release signal to unlock the door (step 47).

The invention claimed is:

1. A secure door entry system comprising:
   an input device for receiving a passcode;
   an electronic device coupled to the input device for verifying the received passcode and generating a door lock release signal if the passcode is verified; and
   a machine readable bar code associated with the door entry system which encodes instructions for establishing a communications channel between a mobile communications device and a remote authentication system where the passcode for the door entry system can be obtained by an authorised person,
   wherein the passcode is encoded within a matrix bar code,
   wherein the instructions encoded within the bar code comprises a predetermined Unique Resource Link (URL), and
   wherein the remote authentication system requires a verified login to authenticate the person, or the combination of the person and the mobile communications device.

2. A secure door entry system according to claim 1, wherein the input device comprises a keypad.

3. A secure door entry system according to claim 1, wherein the input device comprises a touch-sensitive screen.

4. A secure door entry system according to claim 1, wherein the input device comprises an image sensor.

5. A secure door entry system according to claim 1, wherein the passcode comprises a numeric or an alphanumeric code.

6. A secure door entry system according to claim 1, wherein the passcode comprises a swipe gesture.

7. A secure door entry system according to claim 1, wherein the matrix bar code is a Quick Response (QR) code.

8. A secure door entry system according to claim 1, wherein the passcode is variable.

9. A secure door entry system according to claim 1, wherein the bar code is a matrix bar code, preferably a Quick Response (QR) code.

10. A secure door entry system according to claim 1, wherein the instructions encoded within the bar code comprises a predetermined telephone number.

11. A secure door entry system according to claim 1, further comprising a door having an electronic lock.

12. A method for controlling access to a secure area via an electronic door entry system comprising:

displaying a bar code associated with the door entry system which can be read by a mobile communications device, the bar code encoding instructions for establishing a communications channel between a mobile communications device and a remote authentication system where a passcode for the door entry system can be obtained by an authorised person;

receiving authentication data for a person over the communications channel from a mobile communications device;

authenticating the person based on the authentication data;

communicating a passcode to the mobile communications device;

receiving a passcode input at the door entry system; verifying the passcode; and generating a door lock release signal for the door entry system if the passcode is verified, wherein the passcode is encoded within a matrix bar code, wherein the instructions encoded within the bar code comprises a predetermined Unique Resource Link (URL), and wherein the remote authentication system requires a verified login to authenticate a person or the mobile communications device, or both.

13. A method according to claim 12, wherein the input device comprises at least one of a keypad, a touch-sensitive screen, an image sensor and a wireless receiver.

14. A method according to claim 12, wherein the passcode is a numeric or an alphanumeric code.

15. A method according to claim 12, wherein the passcode is a swipe gesture.

16. A method according to claim 12, wherein the matrix bar code is a Quick Response (QR) code.

17. A method according to claim 12, wherein the passcode is variable.

18. A method according to claim 12, wherein the bar code is a matrix bar code, preferably a Quick Response (QR) code.

19. A method according to claim 12, wherein the instructions encoded within the bar code comprises a predetermined telephone number.

20. A method according to claim 12, further comprising establishing a communications channel between the mobile communications device and an authentication service that authenticates the person.

21. A method according to claim 12, further comprising recognizing the instructions encoded in the bar code, and upon the action of recognition of the instructions, establishing a communications channel between the mobile communications device and an authentication service that authenticates the person.

* * * * *